Patented May 18, 1948

2,441,612

UNITED STATES PATENT OFFICE 2,441,612

BENZTHIAZOLE AZO DYE

Christopher Stanley Argyle and Sydney Alfred Gibson, Spondon, near Derby, England, assignors, by mesne assignments, to Celanese Corporation of America, a corporation of Delaware No Drawing. Application June 27, 1942, Serial No. 448,830. In Great Britain July 23, 1941

1 Claim. (Cl. 260—158)

This invention relates to the production from certain aminoazo compounds of polyazo dyes specially suitable for the colouring of textile and other materials of cellulose ethers or cellulose esters of organic carboxylic acids.

The aminoazo compounds employed are obtainable by coupling a diazotised 2-amino-thiazole with a para coupling primary arylamine. They are, therefore of the general formula:

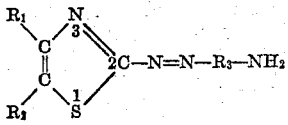

where $R_1$ and $R_2$ are hydrogen or organic substituents or where $R_1$ and $R_2$ together with the two carbon atoms to which they are attached represent a ring system, e. g. a benzene ring, and $R_3$ is an aromatic nucleus. The numbers shown in the thiazole ring are a guide to the nomenclature employed in the present specification. These aminoazo compounds are conveniently termed amino-aryl-azo-2-thiazoles.

According to the present invention the said aminoazo compounds are converted into azo dyes by diazotisation and coupling with amine coupling components. The new azo dyes so obtained are particularly useful for the production of coloured cellulose ester or cellulose ether textile and other products.

The new azo dyes are of special merit when formed on cellulose ester or ether textile materials. With their aid it is possible to produce a series of valuable blue to black dyeings, including dyeings of very desirable greenish navy blue shades, which are dischargeable and have very good fastness properties. The dyes can also be produced in substance, in which form they can be employed for the colouration of cellulose ester or ether solutions. These coloured solutions can be spun into coloured cellulose ester or ether filaments having the valuable properties of cellulose ester or ether filaments coloured by forming the dyes thereon.

Examples of 2-aminothiazoles applicable in the formation of the aminoazo compounds are 4-methyl-2-amino-thiazole, 2-amino-benzthiazole, 6-methoxy or 6-ethoxy-2-aminobenzthiazole, 6-methyl-2-aminobenzthiazole, 6-chloro-2-aminobenzthiazole, 6-ethyl-2-amino-benzthiazole, 6-acetylamino-2-amino-benzthiazole and 4:5-benzo-2-amino-benzthiazole. Advantageously a 2-amino-benzthiazole is employed.

The 6-chlor-2-aminobenzthiazole can be obtained by converting p-chlor-aniline hydrochloride into p-chlor-phenyl-thiourea by the action of ammonium thiocyanate and subjecting the thiourea to the action of sulphuryl chloride in chloro-benzene. The 6-ethyl-2-aminobenzthiazole can be obtained similarly from p-aminoethylbenzene hydrochloride. The 6-acetylamino-2-aminobenzthiazole can be obtained by dissolving p-amino-acetanilide and ammonium thiocyanate in glacial acetic acid and adding bromine.

As second components of the aminoazo compounds it is preferred to employ aniline, alpha-naphthylamine or their para-coupling nuclear substitution products for example 1-amino-2-naphthol-ethyl-ether and aniline having in the meta position, or in two positions para one to the other, a substituent or substituents selected from alkyl, alkyloxy, acidylamino or halogen. Examples of such substituted anilines are 2:5-dimethoxy-aniline, 2:5-di-(oxyethoxy)-aniline, cresidine (3-methyl-6-methoxy-aniline), p-xylidine, m-toluidine, m-chloraniline and m-acetylamino-aniline.

Again it is preferred that the amine component with which the diazotised aminoazo compound is coupled should be an N-alkyl, N-aryl, N-aralkyl, N-cyclo-alkyl- or other N-substitution product of aniline or alpha-naphthylamine or their para-coupling nuclear substitution products. In the case of aniline derivatives it is preferred that if a nuclear substituent is present for example an alkyl group, an alkoxy group, an acidylamino group or a halogen atom, it should be in meta position to the amino group and that if two nuclear substituents are present they should be in para position one to the other. Specific examples of coupling components are diethylaniline, N-di-(oxyethyl)-m-toluidine, N-diethyl-m-anisidine, N-diethyl-m-amino-acetanilide, N-di-(beta-hydroxyethyl)-m-amino-acetanilide and monoethyl-alpha-naphthylamine. Also included among the amine coupling components which can be employed in accordance with the invention are those in which the amino nitrogen forms part of a heterocyclic ring, e. g. N-phenyl-piperidines and N-phenyl-morpholines.

Of the m-acidylamino-N-substituted anilines those in which the acidyl is an acidyl radicle of an aliphatic carboxylic acid containing less than 5 carbon atoms, e. g. a propionyl radicle or an acetyl radicle, are of special value for forming azo dyes on cellulose acetate or other textile materials. Those in which the acidyl radicle is one containing a larger number of carbon atoms, e. g. 9 or more carbon atoms are more particularly of value for the production of dyes in substance.

Examples of such acidyl radicles are those of lauric acid, palmitic acid, stearic acid and oleic acid and other fatty acids containing at least 12 carbon atoms and those of benzoic acid and other aromatic acids. Examples of coupling components containing such acidyl groups are the 3-lauroylamino and 3-stearoylamino derivatives of N-diethylaniline.

Specific aminoazo compounds which can be employed with great advantage are those obtainable coupling diazotised 2-amino-benzthiazole or 6-ethoxy-2-amino-benzthiazole with cresidine, 2:5-dimethoxyaniline, or alpha-napthylamine. All give blue to black shades (depending on the proportion applied to the material) when diazotised on cellulose acetate textile material and developed with one of the coupling components specified above. With diethyl aniline reddish navy blue shades are obtained, and with diethyl-m-amino-acetanilide greenish navy blue shades. When di-(oxyethyl)-m-toluidine is used intermediate shades of navy blue result.

As regards the procedure to be followed in forming the dyes on cellulose ester or ether materials, it is preferred to incorporate in the material the aminoazo compound and then to effect diazotisation and couple with the coupling component in a separate bath.

The aminoazo compounds can be applied to cellulose ester or ether materials in the form of aqueous dispersions. Bath methods may be employed, that is to say methods in which the materials are allowed to absorb the aminoazo compound from an aqueous dispersion of the latter in which they are immersed. Again, mechanical impregnation methods may be used, the materials being impregnated with a liquid containing the requisite proportion of the aminoazo compound. To this end padding or printing methods may be utilized. The mechanically impregnated material may then be aged or steamed to cause the aminoazo compound to enter the cellulose ester or ether material.

The aminoazo compounds used according to the present invention have substantive affinity for cellulose esters or ethers but in general substantially no affinity for cellulose. If, therefore, such an aminoazo compound is applied to mixed materials containing both cellulose, e. g. cotton or regenerated cellulose, and a cellulose ester or ether, the latter alone takes up the aminoazo compound so that on diazotising and coupling with the coupling component the cellulose component of the material remains uncoloured. By suitably colouring the cellulose component of such mixed material with dyestuffs resisting the cellulose ester or ether component of the materials solid shades or two colour effects can readily be obtained according to the components and dyes selected. The dyestuff for the cellulose portion can be applied before or after the development of the azo dye on the cellulose ester or ether portion. If applied before development of the azo dye it may be applied either together with or separately from the aminoazo compound applied to the cellulose ester or ether portion. If the dyestuff for the cellulose component is diazotisable it can be diazotised and developed with a suitable coupling component at any convenient stage of the operation. Further, if desired, the coupling component employed in accordance with the present invention for the formation of an azo dye on the cellulose ester or ether component of the material may simultaneously be used to develop the diazotised dyestuff on the cellulose component of the mixed material.

The dyeings produced on the cellulose ester or ether materials with the aid of the aminoazo compounds in accordance with the invention, may be topped with other dyes and particularly with dyes having direct affinity for the cellulose ester or ether. For example a navy blue shade may be topped with an orange dye or with both a red dye and a yellow dye in order to produce a very dark navy or a black shade. Again, a light or medium shade of blue produced in accordance with the invention may be topped to produce a wide range of dark shades such as browns, bottle greens, deep wine and so on. Providing dischargeable topping colours are employed, dischargeable compound shades can be obtained.

If desired, instead of applying the topping colours after the formation of the dye on the material in accordance with the invention, the said topping colours may be applied prior to the coupling operation, for instance they may be applied to the material together with the aminoazo compound. In this way some economy of time and materials may often be secured.

Though the dyeings produced in accordance with the invention can be topped with other dyes for the production of compound shades, it is a merit of dyes of the present invention that they can be formed on cellulose ester or ether materials so as to produce navy blue shades of commercially desirable hues directly and without recourse to a topping operation.

As mentioned above the new dyes can also be produced in substance. When formed in substance the dyes are of particular value for colouring cellulose ester or ether solutions, especially lacquers and spinning solutions. By shaping and setting such solutions in the form of filaments, straws, films and like shaped products, valuable coloured shaped articles can be produced. For example, coloured cellulose acetate filaments can be produced by dry spinning such coloured solutions. For colouring spinning solutions or other solutions of cellulose acetate or other cellulose esters or ethers those of the above dyes are especially useful which are derived from m-acidyl-amino-N-substituted anilines in which the acidyl radicle contains at least 5 carbon and specially 9 or more carbon atoms. These dyes have such good solubility in acetone and other organic liquids that sufficient can be dissolved in a spinning solution for the latter to yield, on spinning, fibres coloured in full shades. Further, the shades obtainable with these dyes are of very good fastness to aqueous treatments.

The coloured products so obtained by spinning methods can be topped with suitable direct dyeing dyes or mixture of dyes in order to produce a wide range of deep shades. For this purpose it is particularly advantageous to spin filaments containing a proportion of dye such that the product is of a blue shade. A single product of this kind can, by suitable choice of topping colour be caused to yield a very large number of commercially desirable shades.

Those dyes of the invention which contain a free amino group can be diazotised and coupled, e. g. on the fibre, with appropriate coupling components, e. g. the N-substituted anilines or alpha-naphthylamines mentioned above or phenolic coupling components, e. g. beta-oxynaphthoic acid. An example of a disazo dye which can be modified in this way is that obtainable by coupling diazotised 6-methoxy-2-amino-benzthiazole with m-toluidine and re-diazotising and coupling with cresidine.

The invention includes the manufacture of the dyes, the dyes themselves, processes for the colouration of materials with the dyes and the coloured materials so obtained.

The invention is of special value in the production of coloured cellulose acetate products. The new dyes may however, be used for the production of coloured products of other cellulose esters, for example cellulose formate, propionate, butyrate or acetate-butyrate, or cellulose ethers, for example methyl, ethyl or benzyl cellulose, or synthetic linear condensation superpolymers, e. g. polyhexamethylene adipamide.

It has also been found, and this modification is included in the scope of the invention, that valuable results can be obtained with the aid of aminoazo compounds derived from 2-amino-oxazoles in place of 2-aminothiazoles, the procedure being otherwise as described above. Examples of suitable 2-amino-oxazoles are 2-aminobenzoxazole, 6-methyl-2-aminobenzoxazole, 6-chloro-2-aminobenzoxazole, 6-methoxy-2-aminobenzoxazole, 5-methyl-2-aminobenzoxazole and 2-amino-naphthoxazole (2-amino - 4:5 - benzo-benzoxazole).

In the nomenclature of the above compounds the numbering employed conforms to the same system as with the thiazoles, in this case the oxygen atom being numbered 1.

The above mentioned 2-amino-benzoxazoles and 2-amino-naphthoxazole can be obtained by the action of hydroxylamine on the corresponding oxazoles having the 2-position free. The oxazoles themselves can be obtained by the action of anhydrous formic acid and sodium formate on the corresponding ortho-amino-phenols or ortho-amino-naphthol.

*Example I*

A cellulose acetate woven fabric is dyed for 1 hour 30 mins. at 75° C. from a 40:1 bath containing 5% on the weight of the goods of a finely comminuted 10% aqueous paste of the aminoazo compound from diazotised 2-amino-benzthiazole and 3-methyl-6-methoxyaniline. Additions of 0.25 g. p. l. soap and 1 cc. p. l. Turkey-red oil are made as dyeing assistants, a portion of these being used to disperse the aminoazo compound which is then sieved into the dyebath. After dyeing the goods are rinsed off and diazotised. The latter is effected by running for 30 mins. in a 40:1 bath at 25° C. containing 5% sodium nitrite, and 20% hydrochloric acid (28° Tw.) on the weight of goods.

After washing off, development is carried out in a 40:1 bath, made up to contain 1 g. p. l. of di-(beta-oxyethyl)-m-toluidine dispersed by warming with three times its weight of Turkey-red oil prior to adding to the bath. The goods are entered at 25° C. and the bath raised to 60° C. in 15 mins., being maintained thereat for a further 30 mins. Development being completed, the goods are then soaped off at 45° C. in a bath containing 0.5% Turkey-red oil, 0.5% soap on the weight of the goods. After a 30 mins. run in this bath the fabric is rinsed off, hydro-extracted and dried. The resulting shade is a pleasing navy blue, of good all-round fastness, readily dischargeable to a good white.

Similarly, navy blue shades can be obtained by substituting for the aminoazo compound of this example the aminoazo compound obtainable by coupling 3-methyl-6-methoxy-aniline with diazotised 2-aminobenzoxazole or 6-methyl-2-aminobenzoxazole.

*Example II*

5% of a 10% aqueous dispersion of the aminoazo compound from diazotised 6-methyl-2-amino-benzthiazole and 3-methyl-6-methoxyaniline is applied to a cellulose acetate woven fabric and diazotised as described in Example I. It is then developed in a bath made up as follows:

0.5% of N-diethyl-m-aminoacetanilide on the weight of goods is warmed with five times its weight of Turkey-red oil and the dispersion thus obtained added to a 40:1 developing bath. The procedure followed is now as described in Example I, the resulting shade being a greenish navy blue of good all-round fastness, readily dischargeable to a good white with a printing paste prepared with sodium formaldehyde sulphoxylate and barium-thiocyanate.

*Example III*

A woven fabric consisting of a cellulose acetate warp and a regenerated cellulose weft in approximately equal weights, is dyed from a bath containing 5% of the aminoazo compound from diazotised 6-methyl-2-amino-benzthiazole and 3-methyl-6-methoxyaniline (10% paste) and 4% Diazo Indigo Blue RR (I. G.) on the weight of the respective fibres. The usual amounts of soap and Turkey-red oil are added and also 50% common salt in portions, to facilitate the exhaustion of the direct cotton colour. Dyeing is carried out at 80° C. for 2 hours from a 50:1 bath, the material then being diazotised and developed with di-(oxyethyl)-m-toluidine as described in Example I. The resulting shade is a solid navy blue of good all-round fastness particularly to soaping and wet treatments, both dyestuffs being simultaneously developed. The shade can also be discharged to white on both fibres.

*Example IV*

A cellulose acetate woven fabric is dyed with 7.5% of the aminoazo compound from diazotised 2-amino-benzthiazole and 3-methyl-6-methoxyaniline (10% paste), 6% of the azo dye from diazotised p-amino-acetanilide and p-phenyl-phenol (10% paste), and 1% of the azo dye from diazotised p-nitraniline and N-dioxyethyl-m-toluidine (10% paste) on the weight of the goods. Dyeing and subsequent diazotisation and development are as described in Example I. The resulting shade is a full black, capable of being discharged to a good white.

*Example V*

500 grams of the aminoazo compound from diazotised 6-methyl-2-amino-benzthiazole and 3-methyl-6-methoxyaniline are added to 1 litre of hydrochloric acid (32° Tw.). To the resulting paste a mixture of 5000 grams of water and 5000 grams of crushed ice is added and the whole stirred thoroughly whilst a solution of 130 grams of sodium nitrite in 1 litre of water is slowly run in. Stirring is continued for 1 hour after which diazotisation should be complete. The filtered diazo solution is then run slowly into a solution of 700 grams of m-stearoyl-amino-diethylaniline in 2 litres of methylated spirit. Coupling is completed by adding a saturated solution of aqueous sodium acetate until the presence of mineral acid is no longer indicated on testing with Congo red paper. The product is then filtered off, washed with methylated spirit, and dried.

Spinning solutions made up to contain up to 3% of the new compound on the weight of cellulose acetate in the "dope," give yarns dyed in light to full navy blue shades when spun in the usual manner. The colouration is of excellent fastness to aqueous treatment.

A dye of similar shade can be obtained by substituting m-acetylamino-diethylaniline for the m-stearoylamino compound in the foregoing example. Yarns of desirable navy blue shade can be likewise obtained by spinning solutions coloured with the product. Their resistance to aqueous treatment, though good, is not quite so good as that of yarns coloured with the product from the m-stearoylamino compound.

Having described our invention what we desire to secure by Letters Patent is:

An azo dye obtainable by coupling diazotised 6-methoxy - 4' - amino - 2' -methyl-5'-methoxy-benzene-1'-azo-2-benzthiazole with a para coupling N-dialkyl-aniline.

CHRISTOPHER STANLEY ARGYLE.
SYDNEY ALFRED GIBSON.

REFERENCES CITED

The following references are of record in the file of this patent:

UNITED STATES PATENTS

| Number | Name | Date |
|---|---|---|
| 2,216,446 | McNally et al. | Oct. 1, 1940 |
| 2,345,010 | Seymour et al. | Mar. 28, 1944 |

FOREIGN PATENTS

| Number | Country | Date |
|---|---|---|
| 789,850 | France | Aug. 26, 1935 |

Certificate of Correction

Patent No. 2,441,612.                                                                                           May 18, 1948.

CHRISTOPHER STANLEY ARGYLE ET AL.

It is hereby certified that error appears in the printed specification of the above numbered patent requiring correction as follows: Column 6, line 29, Example III, for "Blue RR" read *Blue BR*; and that the said Letters Patent should be read with this correction therein that the same may conform to the record of the case in the Patent Office.

Signed and sealed this 10th day of August, A. D. 1948.

[SEAL]

THOMAS F. MURPHY,
*Assistant Commissioner of Patents.*